June 26, 1962  F. E. AHNERT  3,040,835
AIR LINE LUBRICATOR
Filed Oct. 27, 1960
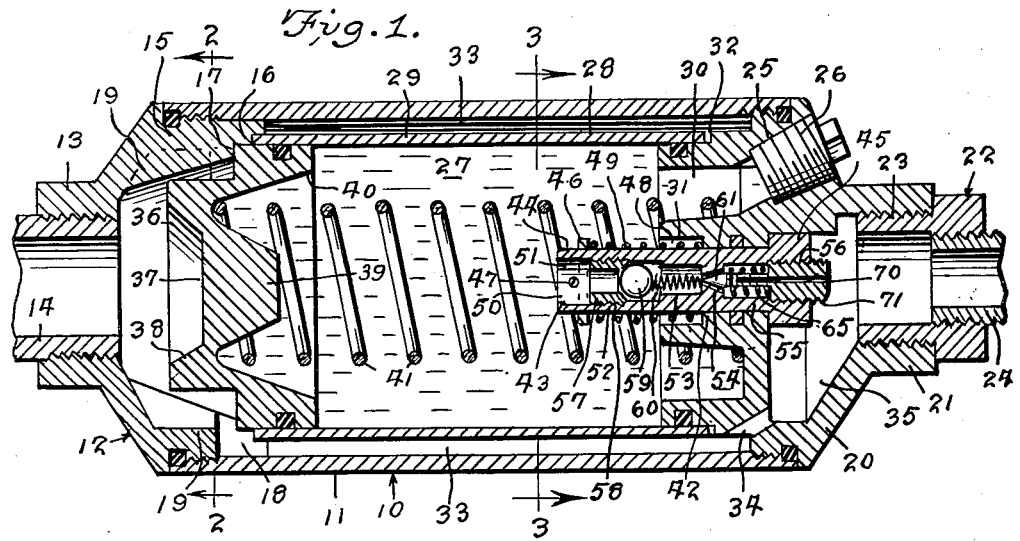
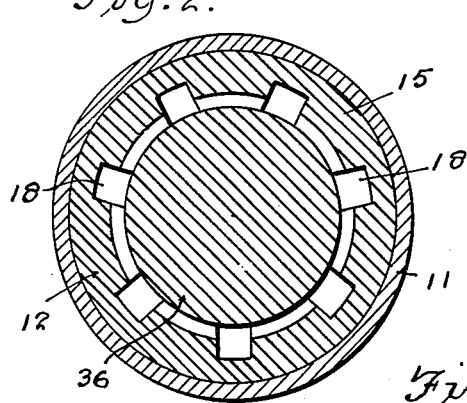
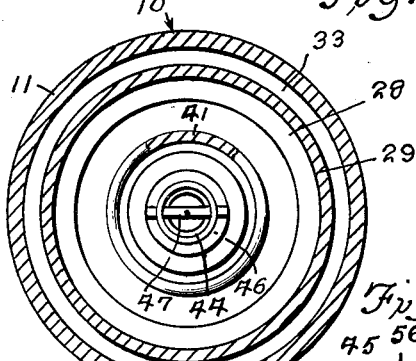
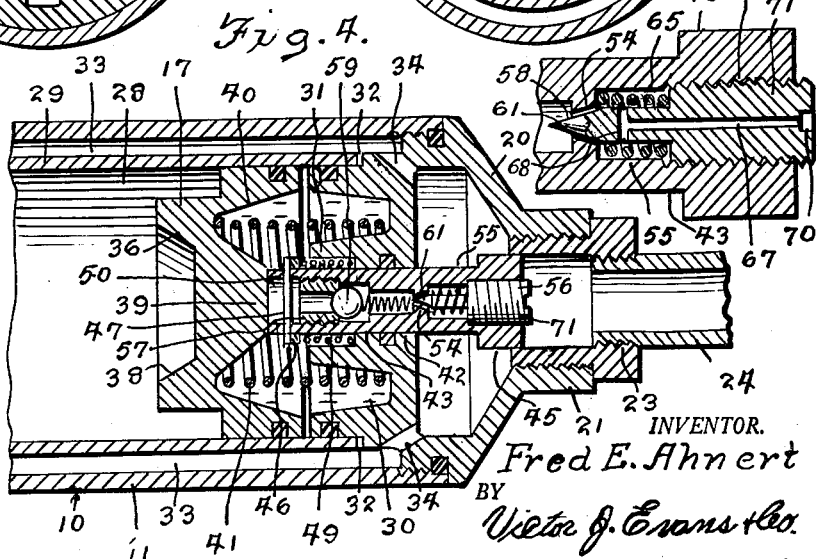
INVENTOR.
Fred E. Ahnert
BY
Victor J. Evans & Co.
ATTORNEYS United States Patent Office 3,040,835
Patented June 26, 1962

3,040,835
AIR LINE LUBRICATOR
Fred E. Ahnert, Joplin, Mo., assignor to Mid-Western Machinery Company, Inc., a corporation of Missouri
Filed Oct. 27, 1960, Ser. No. 65,316
1 Claim. (Cl. 184—55)

The present invention relates to an air line oiler or lubricator for use with pneumatic rock drills or the like.

The object of the invention is to provide an air line lubricator which is adapted to be used for supplying compressed air with a lubricant or oil so that various types of equipment or apparatus can be properly lubricated and for example pneumatic rock drills which are operated by air pressure can be effectively and efficiently oiled as the tools or equipment are used.

Another object of the invention is to provide an air line lubricator which can be adjusted so that the amount of oil going into the air stream at the air outlet can be regulated or controlled, and wherein the air will be shut off when the oil chamber is empty, the air line lubricator further including a ball check valve which will prevent oil from feeding through a needle valve by gravity when the air is shut off at the air tool and the pressures are equalized.

Another object of the invention is to provide an air line lubricator which will automatically shut off the air when the oil reservoir or chamber is empty, and wherein the outgoing air can be lubricated with the desired amount of oil when desired or required.

A further object is to provide an air line lubricator of the type stated that is economical to manufacture and efficient in operation and which is rugged in structure and foolproof in use.

These and other objects of the invention will become apparent from a reading of the following specification and claim, together wth the accompanying drawings, wherein like parts are referred to and indicated by like reference characters and wherein:

FIGURE 1 is a longitudinal sectional view taken through the air line lubricator of the present invention.

FIGURE 2 is a sectional view taken on the line 2—2 of FIGURE 1.

FIGURE 3 is a sectional view taken on the line 3—3 of FIGURE 1.

FIGURE 4 is a fragmentary sectional view showing the piston in a different position from that shown in FIGURE 1, and showing the air line lubricator cut off.

FIGURE 5 is a fragmentary enlarged sectional view showing certain constructional details of the needle valve and its associated parts.

Referring in detail to the drawings, the numeral 10 indicates the air line lubricator of the present invention which is shown to comprise a hollow cylindrical housing 11, and the numeral 12 indicates a head which includes a reduced diameter portion 19 that threadedly engages an inner end of the housing 11. The head 12 further includes in internally threaded outer end portion 13, and a conduit or line 14 is arranged in threaded engagement with the neck 13, and the conduit 14 is adapted to be connected to a suitable source of compressed air. The head further includes an inner end portion 15 which is shaped to include stepped shoulders or recesses 16 and 17, and there is provided in the inner portion 15 of the head 12 a plurality of spaced apart ports or openings 18 for the passage therethrough of air as later described in this application.

There is further provided a body member which is indicated generally by the numeral 20, and the body member 20 is mounted in the opposite end of the housing 11 from the head 12, the body member 20 including an outer end portion 21 of reduced size, and the numeral 22 indicates a fitting which has a portion thereof arranged in threaded engagement with the body member 20, and the fitting 22 is provided with a chamber or recessed portion as indicated by the numeral 23. The numeral 24 indicates a conduit or line which is connected to the fitting 22, and the conduit 24 is adapted to have lubricated air pass therethrough, as for example when such lubricated air is to be used with pneumatic rock drills or the like. The body member 20 is provided with a filling opening 25 whereby oil 27 can be supplied to a chamber 28 which is defined in a hollow casing 29, and a removable closure 26 is arranged in threaded engagement with the opening 25.

The body member 20 is provided with a circular recess 30 which defines a centrally disposed inwardly extending projection 31 on the body member 20, and there is provided an annular grooved portion 32 on the inner end of the body member 20, FIGURE 1. One end of the casing 29 engages the grooved portion 32, and the other end of the casing 29 engages the stepped shoulder 16 of the head 12. The casing 29 is spaced inwardly from the housing 11 so that there is defined an annular space 33 between the casing 29 and housing 11, and there is provided in the body member 20 a plurality of spaced apart ports or openings 34 which establish communication between the space 33 and the area 35.

Movably or reciprocally mounted in the chamber 28 of the casing 29 is a piston or plunger which is indicated generally by the numeral 36, and the piston 36 has its outer end portion recessed as at 37 so as to define an annular shoulder 38, and the inner portion of the piston 36 is recessed as at 40 so as to define an inwardly disposed central projection 39. The numeral 41 indicates a first spring member or coil spring which is interposed between the piston 36 and the body member 20, and one end of the spring 41 engages the recess 40, while the other end of the spring member 41 engages the recess 30.

The body member 20 is provided with a central opening or bore 42, and the numeral 43 indicates a bushing which has a cylindrical section 44 that extends through the bore 42, and the bushing 43 also includes an enlarged outer end portion or flange 45. A circular collar 46 is mounted on the section 44, and a retaining pin 47 extends through the section 44 and is abutted by the collar 46. The projection 31 is recessed as at 48, and a coil spring 49 has one end seated in the recess 48, while the other end of the coil spring 49 abuts the collar 46.

The bushing 43 is provided with a longitudinally extending passageway that is indicated generally by the numeral 50, and the passageway 50 is shaped to include a first section 51 which is threaded as at 52 for a portion of its length. The passageway 50 also includes a second section 53 which is of smaller size than the first section 51, and there is provided a flaring third section 54 which communicates with the second section 53, and a fourth section 55 communicates with the flaring third section 54. The fourth section 55 is threaded as at 56 for a portion of its length whereby a threaded portion of a needle valve can be received therein as later described in this application.

The numeral 57 indicates a hollow open ended sleeve which is arranged in threaded engagement with the portion 52 of the first section 51 of the passageway 50, FIGURES 1 and 4, and one end of the sleeve 57 is shaped to define a valve seat 58. The numeral 59 indicates a ball valve which is mounted for movement into and out of opened or closed relation with respect to the valve seat 58. A coil spring 60 is arranged in the second section 53 of the passageway 50, and the coil spring 60 engages or abuts the ball valve 59 for normally urging or biasing the ball valve 59 into closing relation with respect to the valve seat 58.

As shown in the drawings there is further provided a needle valve which is indicated generally by the numeral 61, and the needle valve 61 embodies a stem which is provided with a tapered end 53 that is arranged in the flaring third section 54 of the passageway 50, and the needle valve 61 also includes an enlarged threaded end portion 71 which threadedly engages the portion 56, and the needle valve 61 is adjustable. A coil spring 65 is circumposed on the stem 62 of the needle valve 61, and the coil spring 65 serves to hold the needle valve 61 in its proper position so as to prevent accidental or inadvertent movement thereof. The needle valve 61 is provided with a longitudinally extending central opening or passageway 67 which has transverse ports 68 communicating therewith.

As shown in FIGURES 4 and 5 for example, the needle valve 61 is provided with a kerf or slit 70 in its outer end whereby a suitable tool such as a screw driver can be arranged in engagement with the kerf in order to rotate or adjust the same.

From the foregoing, it is apparent that there has been provided an air line lubricator which is especially suitable for use in supplying oil or lubrication to a medium such as compressed air as for example when such air is to be used for operating or actuating tools such as pneumatic rock drills. In use, with the parts arranged as shown in the drawings, it will be seen that air is adapted to be supplied from a suitable source of supply through the conduit 14, and with the parts arranged as shown in FIGURE 1, and with the casing 29 filled with oil as indicated by the numeral 27, it will be seen that as the air enters through the conduit 14, some of this air will impinge on the portion 37 of the movable piston 39, while the rest of the air will pass through the ports 18 and this air from the ports 18 will pass through the space 33 and then through the ports 34 into the space 35 and out through the area 23, and then through the conduit 24 so that this air from the conduit 24 can be directed to the tool or other equipment being operated. The air which flows or passes out through the conduit 24 is supplied with lubrication from the chamber 28 due to the following taking place. As the air impinges on the piston 39, it will have a tendency to move the piston 39 from left to right, FIGURE 1, so as to exert pressure on the oil 27 in the chamber 28, and when sufficient pressure is built up or exerted on the oil 27, the ball valve 59 will be moved away from its normally closed position with respect to the valve seat 58 so that some of the oil can flow through the first section 51 of the passageway 50 in the bushing 43, and this oil can flow through the sleeve 57, as for example when the ball valve 59 is moved away from the valve seat 58, and the spring member 60 serves to normally urge or bias the ball valve 59 into closing relation with respect to the valve seat 58, but when the piston 36 exerts sufficient pressure on the oil 27, the holding power of the spring 60 can be overcome in order to move the ball valve 59 away from the valve seat 58.

This oil will then flow through the section 53 of the passageway 50 and past the tapered portion 63 of the needle valve 61 which has been adjusted with respect to the flaring section 54 so that there will be a slight clearance between these parts whereby the oil can flow through this clearance or space and this oil can then flow through the section 55 and enter the port 68 and then flow through the passageway 67 so that this oil will be able to flow out through the passageway or opening 67 in the needle valve 61 whereby the oil from the opening 67 will mix with the air in the chamber 35 and space 23 so that the outflowing air passing through the conduit 24 will be lubricated with the desired quantity of oil. The needle valve 61 is of one piece construction, and the spring 65 is compressed on the stem of the needle valve between the threaded end 71 of the needle valve 61 and the shoulder 72 in the bushing. The spring 65 merely holds the needle valve in adjustment. There is a transverse port 68 in the stem of the needle valve which is connected to the central longitudinal port 67 that extends to the end of the needle valve for discharge of the oil to the air stream.

As the air line lubricator of the present invention is continued to be used, the oil 27 in the chamber 28 will gradually be used up and eventually the piston 36 will move all the way from a position such as that shown in FIGURE 1 to the position such as that shown in FIGURE 4 and when the piston 36 is in the position of FIGURE 4, it will be seen that the projection 39 of the piston will abut the end of the bushing 43, and then as the piston 36 continues to move or slide in the casing 29, it will push the bushing 43 from left to right through the bore 42 whereby the head or flange 45 of the bushing 43 will move into blocking or closing relation with respect to the chamber 23 of the fitting 22. This will have the practical effect of closing off the further flow of air out through the conduit 24, so that it will be seen that when the supply of oil lubricant is used up, the flow of air will be automatically stopped and this functions as a safety arrangement so as to insure that only lubricated air will be supplied to the pneumatic rock drills or other tools.

To reuse the air line lubricator of the present invention after the supply of oil has been used up, the incoming air supply through the conduit 14 can be suitably turned off temporarily whereby the return spring 41 will automatically move the piston 36 back to a position such as that shown in FIGURE 1 from a position such as that shown in FIGURE 4. Then, the closure 26 can be unscrewed from the opening 25 and additional oil 27 can be placed in the chamber 28 so that by again turning on the compressed air supply, the air line lubricator will function in the desired manner as previously stated.

The needle valve 61 can be rotated by using a tool such as a screw driver in the kerf 70 whereby the needle valve 61 can be rotated or adjusted in the threaded portion 56 of the passageway in the bushing, and for example by properly rotating the needle valve 61, the opening and closing of the needle valve 61 can be regulated and this provides a means for controlling the amount of oil which flows through the lubricator and intermixes with the compressed air.

The spring 60 serves to normally urge the ball valve 59 into closing relation with respect to its valve seat 58, but when sufficient pressure is exerted on the oil 27, the ball 59 can be opened by overcoming the holding power of the spring 60.

When the present invention is being reset, as for example when the supply of oil has been used up, it is to be noted that when the air supply through the inlet conduit 14 is turned off, the return spring 41 will automatically return or move the piston 36 from the position shown in FIGURE 4 to the position of FIGURE 1. At the same time, the coil spring 49 will return the bushing 43 from the position of FIGURE 4 to the position of FIGURE 1 so that after the device has been filled with a new supply of oil it is ready to be used again. The coil spring 49 has one end arranged in the recess 48, while the other end of the coil spring 49 bears against the collar 46 which is held in place by the retaining pin 47 so that the coil spring 49 has a tendency to normally urge the bushing 43 from right to left, FIGURES 1 and 4, but as previously stated when the oil is depleted or used up from the chamber 28, the air striking the portion such as the portion 37 of the piston 36 will be sufficient to have the projection 39 push the bushing 43 from left to right, FIGURES 1 and 4 whereby the holding power of the spring 49 can be overcome.

The parts can be made of any suitable material and in different shapes or sizes.

It is to be understood that the line 14 functions as an air inlet, and the lubricated air flows or passes out through the line or conduit 24. Suitable gaskets, sealing members, O rings and the like can be used wherever desired or required. The present invention is especially suitable for use as an air line oiler for use with pneumatic rock drills, but it is to be understood that it can be used with other types of equipment in addition to pneumatic rock drills. An important feature or aspect of the present invention is the fact that the air will be automatically shut off when the oil reservoir is empty.

By way of further explanation of the operation of the air line oiler, it is to be noted that the air line 14 is attached to the portion 13 of the head 12, so that the incoming air stream impinges against the piston 36 to force the piston forward to build up a pressure in the oil chamber 28. This pushes the ball check 59 off of its seat 58 so as to allow a small amount of oil to pass on to the needle valve 61 which regulates the amount of oil going into the air stream at the air outlet, so that the outgoing air will be lubricated. As the piston 36 moves forward and the oil in the chamber 28 is used up, the piston 36 engages the shut-off valve or bushing 43 and pushes it forward until the portion 45 is positioned in the air outlet space 23 so as to shut off the air when the oil chamber is empty. The purpose of the ball check 59 is to stop the oil from feeding through the needle valve 61 by gravity when the air is shut off at the air tool and the pressures are equalized.

Minor changes in shape, size and rearrangement of details coming within the field of invention claimed may be resorted to in actual practice, if desired.

What is claimed is:

In an air line lubricator, a hollow housing, a head including an externally threaded reduced diameter portion threadedly engaging an inner end portion of said housing, said head further including an internally threaded end portion for connection to a conduit that is adapted to be connected to a source of air under pressure, a body member mounted in the opposite end of the housing from said head, said body member including an outer end portion of reduced size, a fitting threadedly engaging the outer end portion of said body member, and said fitting adapted to have an outlet conduit connected thereto, there being an oil filling opening in said body member, a removable closure mounted in said opening, said body member further including an annular recess which defines a centrally disposed inwardly extending projection on said body member, a cylindrical casing arranged in said housing, there being a space between said casing and housing, there being a plurality of spaced apart ports in said head and also in said body member communicating with the space between said housing and casing, the interior of the casing defining an oil chamber, a piston movably mounted in said chamber, said piston including an inwardly disposed projection, a return spring having one end surrounding the projection on said piston and the other end of said return spring surrounding the projection on said body member, there being a central bore in said body member, a bushing including a cylindrical section extending through said bore, said bushing further including an enlarged outer flange, a circular collar on the cylindrical section of said bushing, a retaining pin extending through said cylindrical section for engagement by said collar, there being a central recess in the projection of said body member, a coil spring having one end seated in said last named recess and the other end of said coil spring abutting said collar, there being a longitudinally extending passageway in said bushing, said passageway including a first section which is threaded for a portion of its length, said passageway further including a second section of less size than said first section, a flaring third section communicating with said second section, said passageway further including a fourth section which is threaded for a portion of its length; a hollow open ended sleeve arranged in threaded engagement with the threaded portion of said first section, an end of said sleeve providing a valve seat, a ball valve adapted to engage the valve seat on the end of the sleeve, a coil spring arranged in the second section of said passageway and engaging said ball valve, a needle valve including a stem having a tapered end arranged in the flaring third section of said passageway, said needle valve further including an enlarged threaded portion which is arranged in threaded engagement with the threaded portion of the fourth section of said passageway, a coil spring circumposed on said stem, and said needle valve having a longitudinally extending opening therein communicating with a transverse port.

References Cited in the file of this patent

UNITED STATES PATENTS

| | | |
|---|---|---|
| 1,984,422 | Nell | Dec. 18, 1934 |
| 2,105,490 | Noble | Jan. 18, 1938 |
| 2,105,492 | Gartin | Jan. 18, 1938 |
| 2,897,919 | Dellner | Aug. 4, 1959 |

FOREIGN PATENTS

| | | |
|---|---|---|
| 1,151,839 | France | Aug. 26, 1957 |